(12) United States Patent
Baril et al.

(10) Patent No.: US 8,630,393 B2
(45) Date of Patent: Jan. 14, 2014

(54) SYSTEM AND METHOD FOR BLOCKING TELEPHONE CALLS

(75) Inventors: Bryce Baril, Lynnwood, WA (US); Matthew Berk, Seattle, WA (US)

(73) Assignee: Marchex, Inc., Seattle, WA (US)

( * ) Notice: Subject to any disclaimer, the term of this patent is extended or adjusted under 35 U.S.C. 154(b) by 322 days.

(21) Appl. No.: 12/844,488

(22) Filed: Jul. 27, 2010

(65) Prior Publication Data

US 2012/0027191 A1 Feb. 2, 2012

(51) Int. Cl.
H04M 1/64 (2006.01)

(52) U.S. Cl.
USPC .......... 379/88.19; 379/88.2; 379/88.21; 379/88.12; 379/349; 379/201.01; 379/142.06; 379/196; 379/210.02; 379/114.14

(58) Field of Classification Search
USPC .......... 379/349, 201.01, 142.06, 196, 210.02, 379/114.14
See application file for complete search history.

(56) References Cited

U.S. PATENT DOCUMENTS

| | | | |
|---|---|---|---|
| 7,295,660 B1 * | 11/2007 | Higginbotham et al. | 379/196 |
| 7,603,417 B2 * | 10/2009 | Ben-Yoseph | 709/206 |
| 7,796,542 B2 * | 9/2010 | Siegrist | 370/259 |
| 2004/0076139 A1 | 4/2004 | Kang-Yeh et al. | |
| 2004/0101123 A1 * | 5/2004 | Garcia | 379/220.01 |
| 2007/0025534 A1 * | 2/2007 | Yezhuvath et al. | 379/114.14 |
| 2007/0071200 A1 | 3/2007 | Brouwer | |
| 2007/0156895 A1 * | 7/2007 | Vuong | 709/225 |
| 2008/0080691 A1 | 4/2008 | Dolan et al. | |
| 2008/0162286 A1 * | 7/2008 | Lieberman et al. | 705/14 |
| 2009/0147936 A1 * | 6/2009 | Won et al. | 379/201.02 |
| 2011/0170680 A1 * | 7/2011 | Chislett et al. | 379/142.06 |

FOREIGN PATENT DOCUMENTS

CA 2536725 A1 8/2006

OTHER PUBLICATIONS

International Search Report and Written Opinion for International Application No. PCT/US11/45403, Mail Date Dec. 8, 2011, 10 pages.

* cited by examiner

*Primary Examiner* — Joseph J Nguyen
(74) *Attorney, Agent, or Firm* — Perkins Coie LLP

(57) ABSTRACT

A facility for blocking telephone calls is described. The facility is implemented by a telecommunications system that manages assigned and unassigned telephone numbers. The facility determines that a call originator has made two telephone calls to two different unassigned telephone numbers. The facility adds the call originator to a blacklist for a default time period. If the call originator calls any managed telephone number during the default time period, the facility renews the default time period. After the default time period expires, if the call originator makes additional telephone calls to other unassigned telephone numbers, the facility adds the call originator to the blacklist for a time period that is increased from the default time period. The facility increases the time period with each additional call to an unassigned telephone number. Accordingly, the time period is a function of the number of unassigned telephone numbers called by the call originator.

26 Claims, 5 Drawing Sheets

| | 505 | 510 | 515 |
|---|---|---|---|
| | call originator | telephone number called | date-time |
| 520a | 212-555-0100 | 212-555-0199 | 2010-06-01 12:32 |
| 520b | 212-555-0100 | 313-555-0120 | 2010-06-02 22:08 |
| 520c | 568-555-0121 | 917-555-0142 | 2010-06-03 18:21 |
| | ... | ... | ... |
| 520d | 212-555-0100 | 212-555-0108 | 2010-06-04 08:56 |
| 520e | 568-555-0121 | 312-555-0137 | 2010-06-04 09:43 |

| | 555 | 560 | 570 | 575 |
|---|---|---|---|---|
| | call originator | automatic | call recipient | expires |
| 580a | 212-555-0100 | 1 | ---- | 2010-06-02 23:08 (*first blacklisting*) 2010-06-04 10:56 (*second blacklisting*) |
| 580b | 568-555-0121 | 1 | ---- | 2010-06-04 10:43 |
| | ... | ... | ... | ... |
| 580c | 309-555-0156 | ---- | 517-555-3927 | ---- |
| 580d | 228-209-7560 | ---- | ---- | ---- |

| | 585 | 590 |
|---|---|---|
| | call originator | current penalty |
| 595a | 212-555-0100 | 1 (*first blacklisting*) 2 (*second blacklisting*) |
| 595b | 568-555-0121 | 1 |

SYSTEM AND METHOD FOR BLOCKING TELEPHONE CALLS

BACKGROUND

Telephone marketers may make telephone calls to a large number of telephone numbers in order to reach as many persons as possible. The telephone marketer may make such telephone calls manually (for example, a person manually dials each telephone number) or automatically (for example, an automatic dialer automatically dials each telephone number). When a person answers such a telephone call, the telephone marketer may play a pre-recorded message about a product or service. Typically, the person called has no interest in the product or service and views the telephone call as serving no legitimate purpose. In some cases, the person may even be charged by their telecommunications provider for receiving the telephone call.

To prevent the telephone marketer from calling again, the person may instruct their telecommunications provider that they do not wish to receive future telephone calls from the telephone marketer. The telecommunications provider may place the telephone marketer's telephone number on a blacklist that the telecommunications provider checks before routing telephone calls to the person.

Such blacklisting, however, does not work if the telephone marketer changes their telephone number. In such a case, the telephone marketer's new telephone number may not be on the telecommunications provider's blacklist. Such blacklisting also does not prevent the person from receiving telephone calls from other telephone marketers. Moreover, such blacklisting may not prevent other persons from receiving telephone calls from the telephone marketer.

The need exists for systems and methods that overcome the above problems, as well as provide additional benefits. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

FIGS. 5A-5C are data structure diagrams illustrating data structures used by the facility in some embodiments.

DETAILED DESCRIPTION

Figure 1:
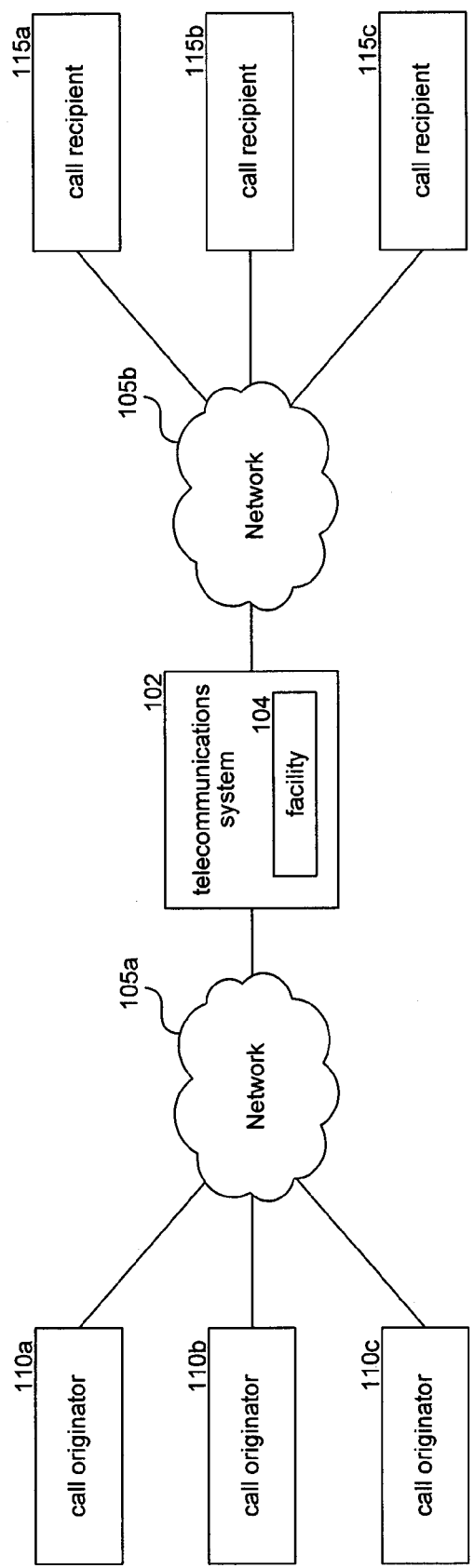
FIG. 1 is a block diagram illustrating an environment in which a facility for blocking telephone calls operates in some embodiments.

A software, firmware, and/or hardware facility for blocking telephone calls (the "facility"), such as telephone calls made by telephone marketers in an automated manner, is disclosed. The facility is implemented by a telecommunications system that manages a pool of telephone numbers. The pool includes telephone numbers assigned to recipients and telephone numbers that are not assigned to any recipient. Telephone calls from entities (referred to herein as call originators) to assigned telephone numbers are routed by the telecommunications system to the entities (referred to herein as call recipients) associated with the assigned telephone numbers. An unassigned telephone number may be a telephone number that has been provisioned but not yet assigned, a telephone number that was once assigned but is no longer assigned, or a telephone number that has been assigned to an inactive call recipient. It will be appreciated that a telephone number may be assigned for a period of time, then unassigned for a period of time, or vice-versa, based upon various factors. The telecommunications system does not route telephone calls from call originators to unassigned telephone numbers.

Instead, the facility utilizes occurrences of telephone calls from call originators to unassigned telephone numbers as a basis for at least temporarily blacklisting the call originators. The facility may do so because there is a high probability that a call originator that has called multiple unassigned telephone numbers is a telephone marketer making unwanted, undesirable, or otherwise illegitimate telephone calls, and therefore should be blocked from reaching call recipients. Such blacklisting results in the telecommunications system at least not routing telephone calls from blacklisted call originators to call recipients.

In some cases, the facility blacklists a call originator by detecting that the call originator has made two telephone calls to two different unassigned telephone numbers within a predetermined window of time. The facility then adds the call originator to the blacklist for a default time period. If the call originator calls any telephone number in the managed pool during the default time period, the facility renews the blacklist default time period for the call originator. After the blacklist default time period expires, if the call originator makes additional telephone calls to other unassigned telephone numbers, the facility adds the call originator to the blacklist for a time period that is equal to or longer than the default time period. The facility increases the blacklist time period with each additional call to an unassigned telephone number. Accordingly, the blacklist time period increases as a function of the number of unassigned telephone numbers called by the call originator.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Illustrative Environment

FIG. 1 is a block diagram illustrating an environment 100 in which the facility (labeled with reference number 104) operates in some embodiments. The facility 104 is part of a telecommunications system 102 that is communicably coupled to one more call originators 110 (shown individually as call originators 110a-c) via a network 105a. The telecommunications system 102 is also communicably coupled to one or more call recipients 115 (shown individually as call recipients 115a-c) via a network 105b. A call originator 110 may be an individual person, a business, a governmental agency, or any other entity capable of initiating telephone calls. A call recipient 115 similarly may be an individual person, a business, a governmental agency, or any other entity capable of receiving telephone calls. The telecommunications system 102 is any system that connects or route telephone calls from the call originators 110 to the call recipients. The networks 105 are any networks suitable for communicably coupling the call originators 110 and the call recipients 115 to the telecommunications system 102, such as a Voice over Internet Protocol (VoIP) network, a cellular telecommunications network, a public-switched telephone network (PSTN), any combination of these networks, or any other suitable network that can carry telecommunications.

As described in more detail herein, the telecommunications system 102 assigns telephone numbers out of a pool of telephone numbers to call recipients 115. A call recipient 115 may already have a telephone number and the telecommunications system 102 may assign other telephone numbers to the call recipient 115. For example, a call recipient 115 may have a telephone number for one geographic locale such as New York City (with a 212 area code), but wish to have telephone numbers in other geographic locales such as Detroit (with a 313 area code) or Seattle (with a 206 area code.) The telecommunications system 102 stores associations between the Detroit and Seattle telephone numbers and the New York City telephone number. When a call originator 110 calls the Detroit telephone number, the telecommunications system 102 receives the telephone call and forwards or routes the telephone call to the New York City telephone number.

In some cases, a call originator 110 is an entity that makes phone calls that are considered illegitimate, unwanted, or otherwise undesirable to the call recipients 115. For example, a call originator 110 may be an automatic telephone dialer, a robodialer, or other initiator of automatic telephone calls that makes a large number of automatic telephone calls to call recipients 115. The call recipients 115 typically view these telephone calls as serving no legitimate purpose and wish to prevent future telephone calls from the call originator 110 from reaching them. As described in more detail herein, the facility 104 performs methods to block such telephone calls.

Illustrative System

Figure 2:
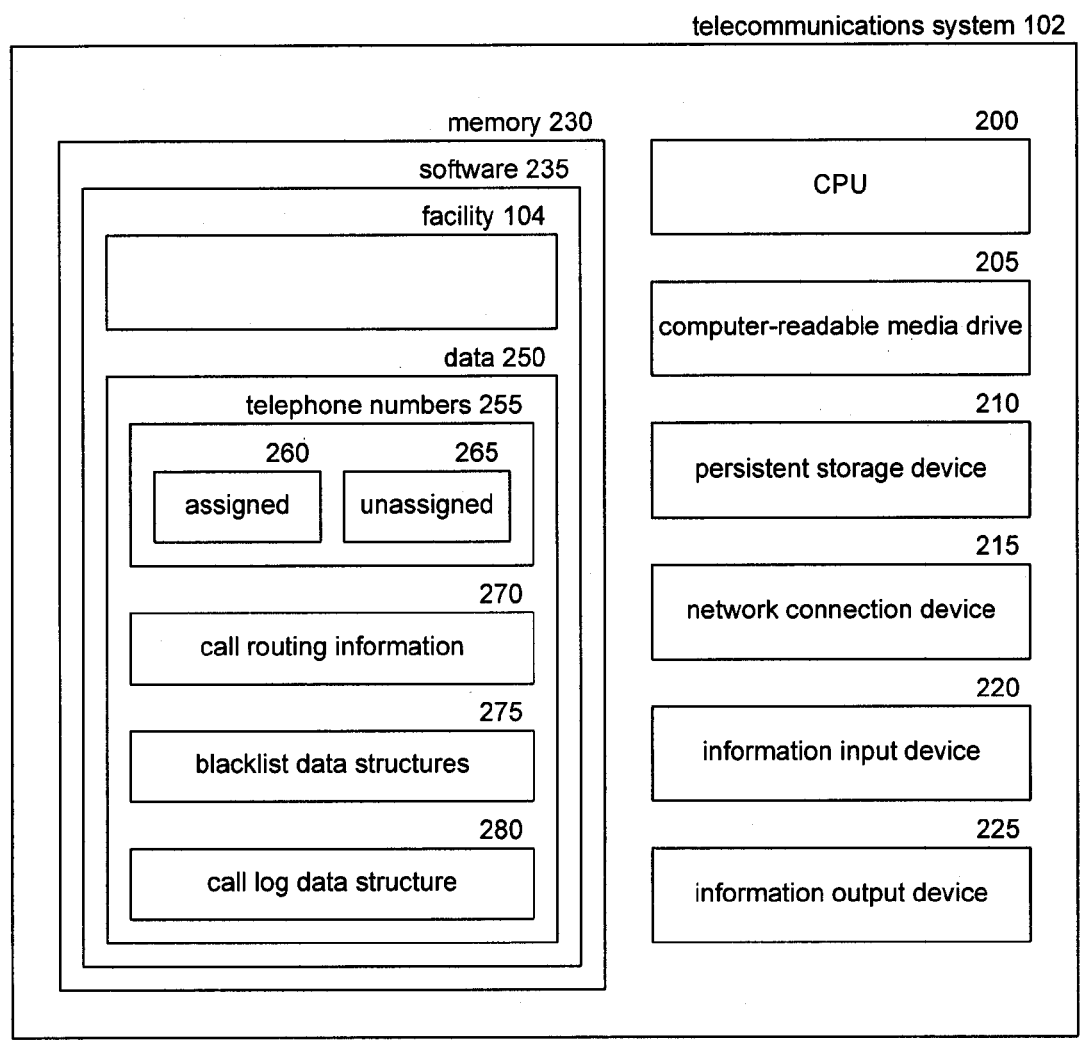
FIG. 2 is a block diagram illustrating a telecommunications system containing the facility in more detail.

FIG. 2 is a block diagram illustrating the telecommunications system 102 in more detail. The telecommunications system 102 includes a memory 230. The memory 230 includes software 235 incorporating both the facility 104 and data 250 typically used by the facility 104. The facility 104 performs certain of the methods or functions described herein, and may include components, subcomponents, or other logical entities that assist with or enable the performance of some or all of these methods or functions. The data 250 includes a set of telephone numbers 255. Telephone calls to the telephone numbers 255 are routed to the telecommunications system 102 for processing. The telephone numbers 255 include both a set of assigned telephone numbers 260 and a set of unassigned telephone numbers 265. Assigned telephone numbers 260 are those telephone numbers that are currently assigned to call recipients 115. The facility 104 routes or forwards a telephone call to an assigned telephone number 260 to the associated call recipient 115. Unassigned telephone numbers 265 are those telephone numbers that are not currently assigned to a call recipient 115. Accordingly, the facility 104 does not route telephone calls to an unassigned telephone number 265. Rather, as described in more detail herein, the facility 104 may provide a call originator 110 making a telephone call to an unassigned telephone number 265 with an indication that the telephone number is unassigned.

The data 250 also includes call routing information 270, which specifies the associations between assigned telephone numbers 260 and call recipients 115. The data 250 also includes a call log data structure 280 that contains data about telephone calls received by the telecommunications system 102, such as telephone calls to assigned telephone numbers 260 and telephone calls to unassigned telephone numbers 265. The data 250 also includes blacklist data structures 275, which are data structures that the facility 102 can use to block certain telephone calls to telephone numbers 255. The blacklist data structures 275 include a first blacklist data structure 275a that contains information about blacklisted call originators 110 (for example, a telephone number of a call originator 110, a blacklist expiration time, and an indication of whether the blacklisting has been done manually or automatically). The blacklist data structures 275 also include a second blacklist data structure 275b that contains information about current blacklist penalties for call originators 110. The blacklist data structures 275 may be referred to herein simply as a blacklist or the blacklist. In some embodiments, the blacklist includes variations of the blacklist data structures 275 and/or additional data structures that the facility 104 to block certain telephone calls.

While items 240 and 250 are stored in memory 230 while being used, those skilled in the art will appreciate that these items, or portions of them, may be transferred between memory 230 and a persistent storage device 210 (for example, a magnetic hard drive, a tape of a tape library, etc.) for purposes of memory management, data integrity, and/or other purposes.

The telecommunications system 102 further includes one or more central processing units (CPU) 200 for executing software 235, and a computer-readable media drive 205 for reading information or installing software 235 from tangible computer-readable storage media, such as a floppy disk, a CD-ROM, a DVD, a USB flash drive, and/or other tangible computer-readable storage media. The telecommunications system 102 also includes one or more of the following: a network connection device 215 for connecting to a network, an information input device 220 (for example, a mouse, a keyboard, etc.), and an information output device 225 (for example, a display).

The systems and components described in FIG. 2 and elsewhere herein may comprise software, firmware, hardware, or any combination(s) of software, firmware, or hardware suitable for the purposes described herein. Software and other components may reside on servers, workstations, personal computers, and other devices suitable for the purposes described herein. In other words, the software and other components described herein may be executed by a general-purpose computer, e.g., a server computer. Furthermore, aspects of the system can be embodied in a special purpose computer or data processor that is specifically programmed, configured, or constructed to perform one or more of the computer-executable instructions explained in detail herein. The system can also be practiced in distributed computing environments where tasks or components are performed by remote processing devices, which are linked through a communications network, such as a Local Area Network (LAN), Wide Area Network (WAN), or the Internet. In a distributed computing environment, program components may be located in both local and remote memory storage devices.

Data structures described herein may comprise computer files, variables, programming arrays, programming structures, or any electronic information storage schemes or methods, or any combinations thereof, suitable for the purposes described herein. Data and software may be stored or distributed on computer-readable media, such as computer-readable storage media and/or tangible media, including magnetically or optically readable computer discs, hard-wired or preprogrammed chips (e.g., EEPROM semiconductor chips), or other data storage media. Indeed, computer implemented instructions, data structures, screen displays, and other data under aspects of the system may be distributed over the Internet or over other networks (including wireless networks), or they may be provided on any analog or digital network (packet switched, circuit switched, or other scheme).

Illustrative Processes

Figure 3:
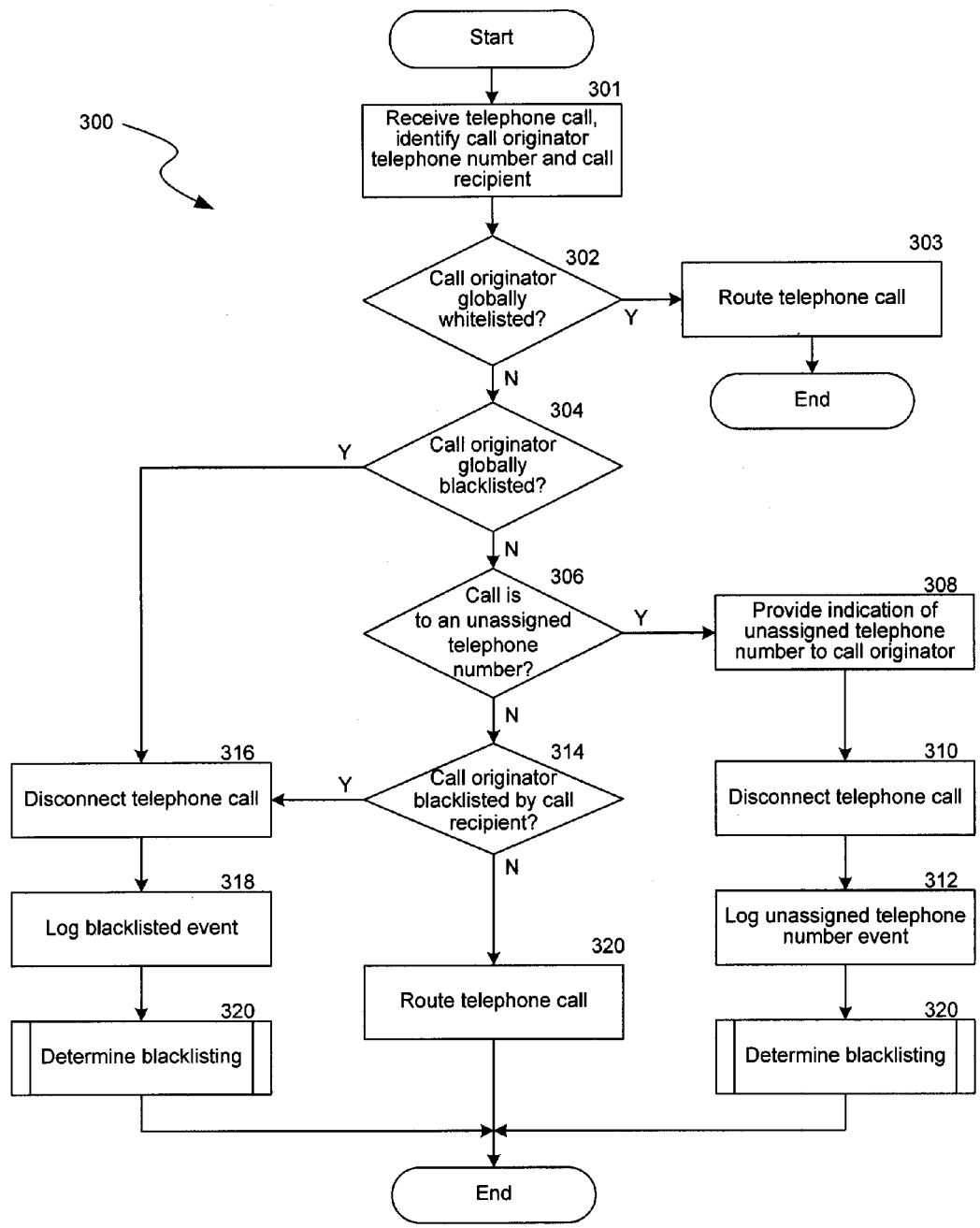
FIG. 3 is a flow diagram illustrating a process implemented by the facility in connection with receiving a phone call in some embodiments.

FIG. 3 is a flow diagram illustrating a process 300 implemented by the facility 104 in connection with receiving a phone call. The process 300 begins at step 301, where the facility 104 receives a telephone call and identifies the telephone number of the call originator 110 and the call recipient 115. The facility 104 may use, for example, caller identification technology to identify the telephone number of the call originator 115 making the telephone call. The facility 104 may use, for example, call routing information 270 to determine a forward telephone number, an account identifier, or other identifier of the call recipient 115.

At decision step 302, the facility 104 determines whether the call originator 110 is globally whitelisted. Some call originators may be automatically approved to make telephone calls by the facility, without screening against a blacklist. For example, a facility operator may have an established relationship with a call originator 110 that would cause the facility operator to trust all telephone calls that originate from the call originator. When the call originator is whitelisted, processing continues to step 303 where the telephone call is routed. In this fashion, the overhead associated with comparing incoming calls against the facility's blacklist are avoided. If, however, the call originator is not whitelisted at decision step 302, processing continues to step 304.

At step 304, the facility 104 determines whether the call originator 110 is globally blacklisted. In this context, globally blacklisted refers to being blacklisted from making telephone calls to any telephone number 255. Such blacklisting may be of temporary duration (for example, as a result of the process 400 of FIG. 4) or of unlimited duration (for example, as a result of a manual determination by a person to permanently blacklist the call originator 110).

If the call originator 110 is not globally blacklisted, the process 300 continues at step 306, where the facility 104 determines whether the telephone call is to an unassigned telephone number 265. The facility 104 may do so by, for example, accessing the telephone numbers 255 and determining whether or not the telephone number being called is a member of the set of unassigned telephone numbers 265. If the telephone call is not to an unassigned telephone number 265, then the process 300 continues at step 314, where the facility determines whether or not the call originator 110 is blacklisted by the call recipient 115. The facility 104 may do so by, for example, accessing the blacklist data structures 275 to determine if the call recipient 115 has blacklisted the call originator 110 from making calls to the call recipient 115. If not, the process continues at step 320, where the facility 104 routes the telephone call to the call recipient 115. The process 300 then concludes.

If the facility 104 determines in step 304 that the call originator 110 is globally blacklisted or in step 314 that the call originator 110 is blacklisted by the call recipient 115, the process 300 continues to step 316, where the facility 104 disconnects the telephone call. In step 318, the facility 104 logs the blacklisted event in the call log data structure 280. At step 320, the facility 104 determines whether to blacklist the call originator 110. This determination is described in more detail with regard to FIG. 4.

If the facility determines in step 306 that the telephone call is to an unassigned telephone number 265, the process 300 continues to step 308, where the facility 104 provides an indication of an unassigned telephone number to the call originator 110 (for example, an audible indication). At step 310, the facility 104 disconnects the telephone call, and at step 312 the facility 104 logs an unassigned telephone number event. At step 320 the facility 104 determines whether or not to blacklist the call originator 110, which is now described with regard to FIG. 4.

Figure 4:
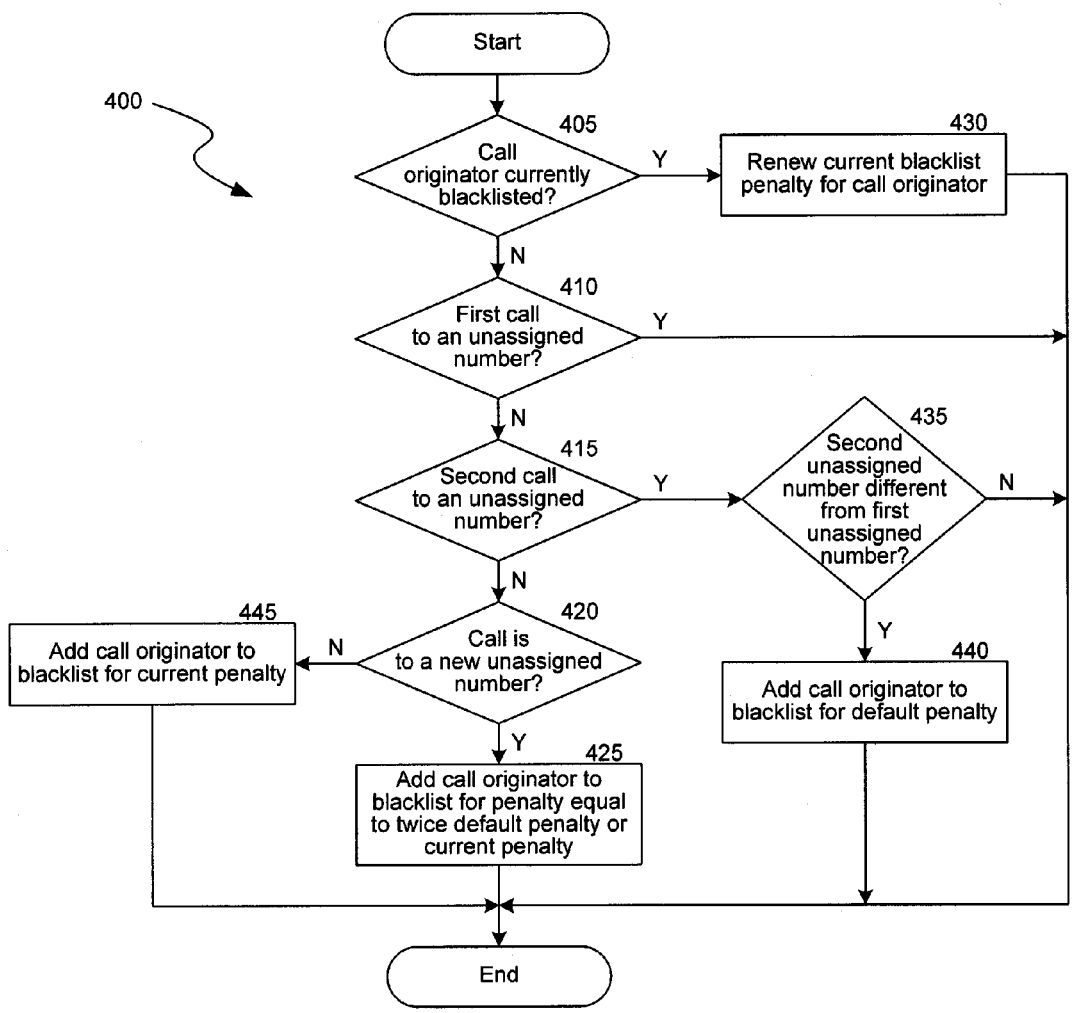
FIG. 4 is a flow diagram illustrating a process implemented by the facility in connection with blacklisting originators of telephone calls in some embodiments.

FIG. 4 is a flow diagram that is illustrating a process 400 implemented by the facility 104 in connection with determining whether to blacklist a call originator 110 in some embodiments. As previously noted, the facility 104 performs the process 400 when step 320 in FIG. 3 is triggered. The process 400 begins at step 405 where the facility 104 determines whether or not the call originator 110 is currently blacklisted. In this context currently blacklisted refers to the telephone number of the call originator 110 being on the first blacklist data structure 275a. If the call originator 110 is currently blacklisted, the process continues at step 430, where the facility 104 renews the current blacklist penalty for the call originator 110.

For example, a call originator 110 may be blacklisted for one hour beginning at 12:42 pm. If the call originator 110 makes another call that triggers the process 400 before 1:42 pm (for example, at 1:08 pm), then the facility would renew the current blacklist penalty for another hour beginning at the time of the other call (for example, for one hour beginning at 1:08 pm). If the call originator 110 is permanently blacklisted, the facility 104 can avoid the step of renewing a current blacklist penalty for the call originator 110. After step 430 the process 400 concludes. At the conclusion of the process 400, flow returns to FIG. 3, where after step 320, the process 300 concludes.

If the call originator 110 is not currently blacklisted, the process 400 continues to step 410, where the facility 104 determines whether or not the telephone call by the call originator 110 is the first telephone call made by the call originator 110 to an unassigned telephone number 265. The facility 104 may do so by accessing the call log data structures 280. If it is the first telephone call to an unassigned telephone number 265 by the call originator 110, then the process 400 concludes.

If it is not the first telephone call to an unassigned telephone number 265 by the call originator 110, then the process 400 continues to step 415, where the facility 104 determines whether or not this is the second telephone call made by the call originator 110 to an unassigned telephone number 265. In some cases, the facility determines whether the first telephone call made by the call originator 110 to an unassigned telephone number 265 occurred within a predetermined window of time (for example, within one to six months) prior to the time the call originator 110 made the second telephone call. If it is the second telephone call, the process 400 continues to step 435, where the facility 104 determines whether or not the second unassigned telephone number 265 that was called by the call originator 110 is different from the first unassigned telephone number 265 called by the call originator 110. If not, the process 400 concludes. If the two unassigned telephone numbers 265 are different, the process 400 continues at step 440, where the facility 104 adds the call originator 110 to a blacklist for a default penalty, which is a default period of time. For example, the default period of time may be anywhere from 30 minutes to six hours. The process 400 then concludes.

Returning to step 415, if the facility 104 determines that the telephone call is not the second telephone call to an unassigned telephone number 265, the process 400 continues to step 420, where the facility 104 determines whether or not the telephone call is to a new unassigned telephone number 265, which is an unassigned telephone number 265 that is different from a previously called unassigned telephone number 265. If not, the process 400 continues to step 445, where the facility 104 adds the call originator 110 to the blacklist for a current penalty that is associated with the call originator 110. As described in more detail herein, the facility 104 may keep track of a current penalty for each call originator 110. The process 400 then concludes.

Returning to step 420, if the facility 104 determines that the telephone call is to a new unassigned telephone number 265, the process 400 continues to step 425, where the facility 104 adds the call originator 110 to the blacklist for a penalty that the facility 104 determines by doubling either the default penalty or the current penalty associated with the call originator 110. In some embodiments, the facility 104 does not increase the current penalty above a maximum penalty. After step 425, the process 400 concludes.

Among other things, the process 400 allows the facility 104 to increase the blacklist penalty for a call originator 110 in relation to the number of different unassigned telephone numbers 265 that the call originator 110 has called. The first time that the call originator 110 has called an unassigned telephone number 265 will not result in the facility 104 adding the call originator 110 to the blacklist (step 410). This may be, for example, because the call originator 110 has a legitimate reason for calling the unassigned telephone number 265 and therefore should not be blocked from calling the telephone numbers 255.

However, the second time that the call originator 110 has called a different unassigned telephone number 265, the facility 104 will assign the default penalty to the call originator 110 (steps 435 and 440). This may be, for example, because the likelihood that the call originator 110 is legitimately calling two different unassigned telephone numbers 265 is quite low, and therefore the facility 104 is justified in blacklisting the call originator 110 and therefore blocking the call originator 110 from calling the telephone numbers 255. In the event that the second telephone call is legitimate, the default penalty can be low (for example, less than several hours) so as to allow the call originator 110 to call telephone numbers 255 after the blacklisting has expired.

If it is the third time or greater that the call originator 110 has called a different unassigned telephone number 265, the likelihood that the call originator 110 is legitimately calling three or more different unassigned telephone numbers 265 is even lower, and thus the facility 104 is justified in blacklisting the call originator 110 for ever-increasing periods of time, thereby preventing the cal originator 110 from reaching the call recipients 115. Calling three different unassigned telephone numbers 265 causes the facility 104 to assign a blacklist penalty that is increased from the default penalty for the call originator 110. For example, if the default penalty is three hours, the facility 104 can double the default penalty to six hours for the call originator 110.

The fourth time the call originator 110 calls an unassigned telephone number 265, the facility can double the current penalty for the call originator 110. For example, if the current penalty is six hours, the facility 104 can double the current penalty to twelve hours. The facility 104 can continue doubling the current penalty for the call originator 110 with each new unassigned telephone number 265 that the call originator 110 calls. In some embodiments, the facility 104 does not increase the current penalty above a maximum penalty (for example, the maximum penalty may be 48 hours). Accordingly, the facility 104 can set the penalty for calling unassigned telephone numbers 265 as a function of the number of unassigned telephone numbers 265 called.

Illustrative Data Structures

FIGS. 5A-5C are data structure diagrams illustrating data structures used by the facility 104 in some embodiments. FIG. 5A illustrates a call log data structure 280 that the facility 104 uses to log telephone calls. The call log data structure 280 contains rows, such as rows 520a and 520b, each divided into the following columns: a call originator column 505 identifying the telephone numbers of the call originator 110, a telephone numbers called column 110 identifying a telephone numbers called, and a date-time column 515 containing a time stamp of when the facility 104 received the telephone call from the call originator 110. FIG. 5B illustrates a blacklist data structure 275a. The blacklist data structure 275a contains rows, such as rows 580a and 580b, each of which is divided into the following columns: a call originator column 555, an automatic column 560, a call recipient column 570, and an expires column 575. FIG. 5C illustrates a blacklist data structure 275b, which contains rows, such as rows 595a and 595b, each of which is divided into the following columns: a call originator column 585 and a current penalty column 590.

The call log data structure 280 contains an entry in row 520a, indicating that a telephone call from a call originator 110 having the telephone numbers 212-555-0100 was received to telephone numbers 212-555-0199 at 12:32 p.m. on Jun. 1, 2010. The telephone numbers 212-555-0199 was a member of the set of unassigned telephone numbers 265 at the time of the telephone call. Since this was the first call from the call originator 110 to an unassigned telephone number 265, the call originator 110 was not blacklisted. Row 520b contains an entry indicating that the same call originator 212-555-0100 made a telephone call to a different telephone number 313-555-0120 at 10:08 p.m. on Jun. 2, 2010 that was also a member of the set of unassigned telephone numbers 265 at the time of the call. Since this was the second time that the call originator 110 called a different unassigned telephone number 265, the facility 104 added an entry in row 580a of blacklist data structure 275a indicating that the call originator 110 is blacklisted and that it is an automatic blacklist (e.g., blacklisted as a result of the process 400 of FIG. 4). The call recipient is not specified in column 570, but the expiration time, which is one hour from the time of the second phone call, is specified in expires column 575. The facility 104 also added an entry in row 595a of blacklist data structure 275b indicating that the current penalty of the call originator 110 is one hour. Solely for readability, there is an indication that the expiration information corresponds to the first blacklisting in expires column 575 and in current penalty column 590.

The facility 104 will prevent any telephone calls received from the call originator 110 having the telephone numbers 212-555-0100 before 11:08 p.m. on Jun. 2, 2010 to any telephone numbers 255 from reaching an associated call recipient 115. If the call originator 110 calls any telephone numbers 255 before such time, the facility 104 will renew the blacklist period for the call originator 110. In other words, if the current penalty for the call originator is one hour, the facility will restart the one hour period from the time of any phone call received from that call originator 212-555-0100.

The call log data structure 280 also contains an entry in row 520d indicating that the call originator 110 having the telephone number 212-555-0100 has called the telephone numbers 212-555-0108 at 8:56 a.m. on Jun. 4, 2010. The telephone number was an unassigned telephone number 265 at the time of the telephone call, and is different from the telephone numbers telephone numbers called column 510 of rows 520a and 520b. Accordingly, the facility 104 doubles the current penalty of the call originator 110, shown in row 595a of blacklist data structure 275b, from one hour to two hours, and adds the entry to the blacklist data structure 275a in row 580a to indicate that the call originator 110 is blacklisted for two hours from the time of the telephone call in row 520d.

Blacklist data structure 275a also contains an entry in row 580c, indicating that any telephone calls from call originator 110 having the telephone numbers 309-555-0156 to the call recipient 115 having the telephone number 517-555-3927, which is a telephone numbers associated with an assigned telephone number 260, are to be blocked. Accordingly, the facility 104 would block any calls from this particular call originator 110 to this particular call recipient 115 (step 314 of FIG. 3). Row 580d also contains an entry indicating that any calls from the call originator 110 having the telephone numbers 228-209-9560 are to be blocked. There is no expiration date for this particular entry in the blacklist data structure, meaning that the blacklisting does not expire, and that the call originator 110 is blacklisted from calling any telephone numbers 255. Accordingly, the facility 104 would block any calls from this particular call originator 110 to any call recipient 115 (step 304 of FIG. 3).

While FIGS. 5A-5C depict tables whose contents and organization are designed to make them more comprehensible by a human reader, those skilled in the art will appreciate that the actual data structure(s) used by the facility to store this information may differ from the tables shown, in that they, for example, may be organized in a different manner, may contain more or less information than shown, may be compressed and/or encrypted, and may be optimized in a variety of ways.

OTHER EXAMPLES

The techniques described herein may be used to prevent types of telecommunications other than telephone calls. For example, the facility 104 could use such techniques to detect text messages (e.g., emails, instant messages, SMS messages, MMS messages, etc.) sent from an originator to multiple unassigned telephone numbers and use such detection to blacklist the originator for periods of time that increase as a function of the number of different unassigned telephone numbers to which text messages are sent by the originator as described herein. Generally, the facility 104 could use the techniques described herein to block various types of telecommunication sessions (e.g., voice calls over a PSTN, over VoIP, over mobile phone networks, or any combination of these and other suitable networks, as well as non-voice telecommunication sessions such as text messages, email messages, etc.) that a party requests using a telephone number as an identifier of or key to a recipient.

The facility 104 can also use the techniques described herein to block telecommunication sessions such as voice calls to recipients identified by identifiers other than telephone numbers. For example, the facility 104 could block telecommunications sessions requested to be made to recipients that are identified by email addresses, Internet Protocol (IP) addresses, Media Access Control (MAC), usernames, or any combination of these identifiers and other suitable identifiers. Accordingly, the facility 104 may use identifiers other than telephone numbers as recipient addresses and use such identifiers as a basis for blocking telecommunication sessions.

Various modifications of the techniques may be made. For example, instead of disconnecting a call originator 110 that is blacklisted (step 316 of FIG. 3), the facility 104 could instead play an audio message requesting a keyed response (for example, "if you a person, please press 442") as a condition of routing the telephone call to the call recipient 115.

CONCLUSION

The above detailed description of examples of the technology is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or subcombinations. Each of these processes or steps may be implemented in a variety of different ways. Also, while processes or steps are at times shown as being performed in series, these processes or steps may instead be performed in parallel, or may be performed at different times.

From the foregoing, it will be appreciated that specific embodiments of the system have been described herein for purposes of illustration, but that various modifications may be made without deviating from the spirit and scope of the system. Accordingly, the system is not limited except as by the appended claims.

We claim:

1. A method, performed by a computing system having a processor and a memory, of adding an originator of a telephone call to a blacklist usable to block telephone calls to a set of multiple assigned telephone numbers, the method comprising:
  receiving a telephone call to a first telephone number;
  identifying an originator making the telephone call;
  determining that the first telephone number is, at the time of the telephone call, a member of a set of multiple unassigned telephone numbers, wherein each of the multiple unassigned telephone numbers is not assigned to an active call recipient;
  determining, by the computing system, that the originator previously made a telephone call to a second telephone number that, at the time of the previous telephone call, was a member of the set of multiple unassigned telephone numbers, wherein the second telephone number is different from the first telephone number;
  adding the originator to the blacklist for a first predetermined period of time;
  receiving one or more subsequent telephone calls made by the originator to additional telephone numbers that are each a member of the set of multiple unassigned telephone numbers; and
  for each of the received subsequent telephone calls, adding the originator to the blacklist for an additional period of time, wherein the additional period of time is capped so that an aggregate penalty period to does not exceed a maximum penalty period.

2. The method of claim 1, further comprising:
receiving a telephone call made by the originator to a third telephone number that is, at the time of the telephone call, a member of the set of multiple unassigned telephone numbers, wherein:
the originator makes the telephone call after the completion of the first predetermined period of time, and
the third telephone number is different from the first and second telephone numbers; and
adding the originator to the blacklist for a second predetermined period of time that is greater than the first predetermined period of time.

3. The method of claim 2 wherein the second predetermined period of time is approximately twice as long as the first predetermined period of time.

4. The method of claim 1 wherein the additional period of time is greater than the first predetermined period of time.

5. The method of claim 1, further comprising:
receiving a telephone call made by the originator during the first predetermined period of time; and
updating the blacklist to renew the first predetermined period of time for the originator.

6. The method of claim 5, further comprising disconnecting the third telephone call.

7. The method of claim 1, further comprising:
receiving a telephone call made by the originator to a third telephone number that is, at the time of the telephone call, a member of the set of multiple unassigned telephone numbers, wherein:
the originator makes the telephone call after the completion of the first predetermined period of time, and
the third telephone number is the same as either the first telephone number or the second telephone number; and
adding the originator to the blacklist for the first predetermined period of time.

8. The method of claim 1 wherein the first predetermined period of time is a default period of time used when an originator is first added to the blacklist.

9. The method of claim 1 wherein the first predetermined period of time is longer than a default period of time used when an originator is first added to the blacklist.

10. The method of claim 1 wherein the times of the telephone call and the previously-made telephone call are within a predetermined window of time.

11. A computing system for blocking telephone calls, the computing system comprising:
a processor; and
a memory containing:
a set of multiple unassigned telephone numbers, wherein each of the multiple unassigned telephone numbers is not assigned to an active call recipient;
a blacklist usable to block telephone calls to assigned telephone numbers; and
a facility programmed to:
identify an originator of a telephone call to a first telephone number;
determine that the first telephone number is, at the time of the telephone call, a member of the set of multiple unassigned telephone numbers;
determine that the originator previously made a telephone call to a second telephone number that, at the time of the previous telephone call, was a member of the set of multiple unassigned telephone numbers, wherein the second telephone number is different from the first telephone number;
add the originator to the blacklist for a first predetermined period of time;
receive one or more subsequent telephone calls made by the originator to additional telephone numbers that are each a member of the set of multiple unassigned telephone numbers; and
for each of the received subsequent telephone calls, add the originator to the blacklist for an additional period of time, wherein the additional period of time is capped so that an aggregate penalty period does not exceed a maximum penalty period.

12. The computing system of claim 11 wherein the facility is further programmed to:
determine that a telephone call to a third telephone number has been received from the originator, wherein:
the third telephone number is, at the time of the telephone call, a member of the set of multiple unassigned telephone numbers,
the telephone call is received after the completion of the first predetermined period of time, and
the third telephone number is different from the first and second telephone numbers; and
add the originator to the blacklist for a second predetermined period of time that is greater than the first predetermined period of time.

13. The computing system of claim 11 wherein the facility is further programmed to:
determine that a telephone call has been received from the originator during the first predetermined period of time; and
update the blacklist to renew the first predetermined period of time.

14. The computing system of claim 11, wherein the additional period of time is greater than the first predetermined period of time.

15. The computing system of claim 11 wherein the facility is further programmed to:
determine that a telephone call to a third telephone number has been received from the originator, wherein:
the third telephone number is, at the time of the telephone call, a member of the set of multiple unassigned telephone numbers,
the telephone call is received after the completion of the first predetermined period of time, and
the third telephone number is the same as either the first telephone number or the second telephone number; and
add the originator to the blacklist for the first predetermined period of time.

16. The computing system of claim 11 wherein the first predetermined period of time is a default period of time used when an originator is first added to the blacklist.

17. The computing system of claim 11 wherein the first predetermined period of time is longer than a default period of time used when an originator is first added to the blacklist.

18. A non-transitory computer-readable storage medium whose contents cause a computing system to perform a method for adding an originator to a blacklist usable for blocking telecommunication sessions, the method comprising:
receiving a request for a telecommunication session with a first unassigned recipient address, wherein the first unassigned recipient address is not assigned to an active telecommunication session recipient;
identifying an originator making the telecommunication session request;

determining that the originator previously made a request for a telecommunication session with a second unassigned recipient address, wherein the second unassigned recipient address is not assigned to an active telecommunication session recipient, and wherein the second recipient address is different from the first recipient address;

adding the originator to a blacklist for a first period of time, wherein the blacklist is usable to block the establishment of telecommunication sessions with assigned recipient addresses receiving one or more subsequent requests for a telecommunication session made by the originator to additional unassigned recipient addresses; and for each of the received subsequent requests for a telecommunication session, adding the originator to the blacklist for an additional period of time, wherein the additional period of time is capped so that an aggregate penalty period does not exceed a maximum penalty period.

19. The non-transitory computer-readable storage medium of claim 18 wherein the method further comprises:

receiving a request for a telecommunication session made by the originator to a third unassigned recipient address, wherein the request for the telecommunication session is received after conclusion of the first period of time, and wherein the third unassigned recipient address is different from the first and second unassigned recipient addresses; and adding the originator to the blacklist for a second period of time that is greater than the first period of time.

20. The non-transitory computer-readable storage medium of claim 18 wherein the method further comprises:

receiving a request for a telecommunication session made by the originator during the first predetermined period of time; and updating the blacklist to renew the first period of time.

21. The non-transitory computer-readable storage medium of claim 18 wherein the method further comprises:

receiving a request for a telecommunication session made by the originator to a third unassigned recipient address, wherein the request for the telecommunication session is received after conclusion of the first period of time, and wherein the third unassigned recipient address is the same as one of the first and second unassigned recipient addresses; and adding the originator to the blacklist for the first period of time.

22. The non-transitory computer-readable storage medium of claim 18 wherein the telecommunication session includes a voice call.

23. The non-transitory computer-readable storage medium of claim 22 wherein the recipient address includes a telephone number.

24. The non-transitory computer-readable storage medium of claim 18 wherein the telecommunication session includes a message session.

25. One or more tangible computer memories storing one or more data structures usable to block telephone calls, the one or more data structures comprising:

information identifying an originator of at least two telephone calls to at least two unassigned telephone numbers, wherein each of the at least two unassigned telephone numbers is not assigned to an active call recipient, and wherein at least a first unassigned telephone number is different from a second unassigned telephone number;

information indicating a period of time during which the originator is blocked from making telephone calls, the period of time based upon a number of telephone calls to unassigned telephone numbers made by the originator, such that the one or more data structures may be used by a computing system to block the originator from making telephone calls during the period of time; and information identifying a current blacklist penalty period associated with the originator, wherein the current blacklist penalty period is capped at a maximum penalty period.

26. The one or more tangible computer memories of claim 25 wherein the computing system extends the period of time in response to a telephone call made by the originator during the period of time.

* * * * *

UNITED STATES PATENT AND TRADEMARK OFFICE
CERTIFICATE OF CORRECTION

| | | |
|---|---|---|
| PATENT NO. | : 8,630,393 B2 | Page 1 of 1 |
| APPLICATION NO. | : 12/844488 | |
| DATED | : January 14, 2014 | |
| INVENTOR(S) | : Bryce Baril et al. | |

It is certified that error appears in the above-identified patent and that said Letters Patent is hereby corrected as shown below:

In the Specification

In column 7, line 56, delete "cal" and insert -- call --, therefor.

In the Claims

In column 10, line 66, in claim 1, after "period" delete "to".

Signed and Sealed this
First Day of April, 2014

Michelle K. Lee
*Deputy Director of the United States Patent and Trademark Office*